(12) United States Patent
Bevis

(10) Patent No.: US 11,998,108 B2
(45) Date of Patent: Jun. 4, 2024

(54) SYSTEMS FOR DETERMINING BRUSHING PARAMETERS IN AN ELECTRIC TOOTHBRUSH

(71) Applicant: KONINKLIJKE PHILIPS N.V., Eindhoven (NL)

(72) Inventor: Taylor Bevis, Bothell, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 739 days.

(21) Appl. No.: 17/053,383

(22) PCT Filed: May 10, 2019

(86) PCT No.: PCT/EP2019/062029
§ 371 (c)(1),
(2) Date: Nov. 6, 2020

(87) PCT Pub. No.: WO2019/215321
PCT Pub. Date: Nov. 14, 2019

(65) Prior Publication Data
US 2021/0227965 A1     Jul. 29, 2021

Related U.S. Application Data

(60) Provisional application No. 62/669,530, filed on May 10, 2018.

(51) Int. Cl.
*A46B 15/00*     (2006.01)
*A46B 5/00*      (2006.01)
(Continued)

(52) U.S. Cl.
CPC ........ *A46B 15/0006* (2013.01); *A46B 5/0037* (2013.01); *A46B 9/04* (2013.01);
(Continued)

(58) Field of Classification Search
CPC ... A61C 17/221; A46B 15/0012; A46B 13/02; A46B 9/04; A46B 5/0037; A46B 15/0006
(Continued)

(56) References Cited

U.S. PATENT DOCUMENTS 5,815,872 A    10/1998    Meginniss, III et al.
5,876,207 A     3/1999    Sundius et al.
(Continued)

FOREIGN PATENT DOCUMENTS

JP    2007054488 A    3/2007
JP    2009020656 A    1/2009
(Continued)

OTHER PUBLICATIONS

International Search Report and Written Opinion, International Application No. PCT/EP2019/062029, dated Jun. 24, 2019.

*Primary Examiner* — Katina N. Henson

(57) ABSTRACT

A brush head (12), an electric toothbrush (10), and a method of operating an electric toothbrush. The electric toothbrush (10) includes bristles extending from a base structure. A plurality of tufts (20) are formed as separate groups of the bristles (23) bundled together. A sensor assembly (28) is configured to generate, for each of the tufts, a signal representative of a force applied to each of the tufts. A controller (18) is configured to generate a tuft signature representing a distribution of the force applied to each of the tufts. This tuft signature may then be classified by appropriate algorithms to determine brushing parameters, such as applied pressure, angle, and the location in the user's mouth.

10 Claims, 8 Drawing Sheets

(51) Int. Cl.
  *A46B 9/04* (2006.01)
  *A46B 13/02* (2006.01)
  *A61C 17/22* (2006.01)
(52) U.S. Cl.
  CPC .......... *A46B 13/02* (2013.01); *A46B 15/0012* (2013.01); *A61C 17/221* (2013.01)
(58) Field of Classification Search
  USPC ....................................................... 15/167.1
  See application file for complete search history.

(56) References Cited

U.S. PATENT DOCUMENTS

| | | | |
|---|---|---|---|
| 6,412,137 B1 * | 7/2002 | Heidari | A46B 15/0012 |
| | | | 15/105 |
| 6,425,295 B1 | 7/2002 | Meginniss | |
| 2012/0310593 A1 * | 12/2012 | Bates | A46B 15/0006 |
| | | | 702/150 |
| 2015/0157119 A1 | 6/2015 | Barnes | |
| 2018/0103747 A1 * | 4/2018 | Lavezzo | A46B 9/04 |
| 2020/0037749 A1 * | 2/2020 | Dishon | A46B 15/0012 |

FOREIGN PATENT DOCUMENTS

| | | | | |
|---|---|---|---|---|
| JP | 2014031094 A | 2/2014 | | |
| JP | 2018011916 A | 1/2018 | | |
| WO | WO-2011073010 A1 * | 6/2011 | ......... | A46B 15/0002 |
| WO | 2015084962 A1 | 6/2015 | | |
| WO | 2016181319 A1 | 11/2016 | | |

* cited by examiner

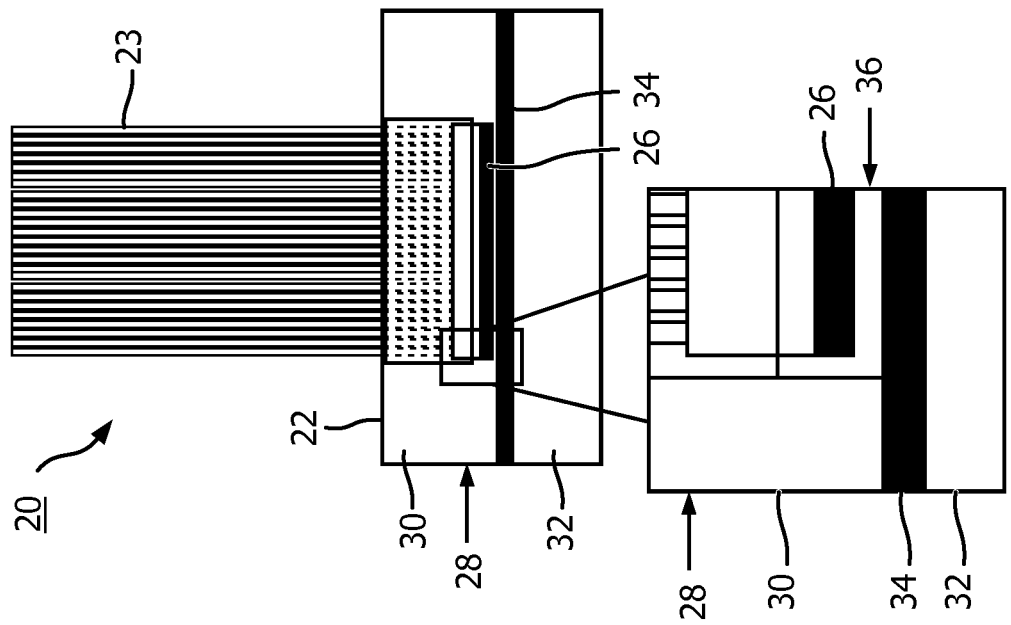
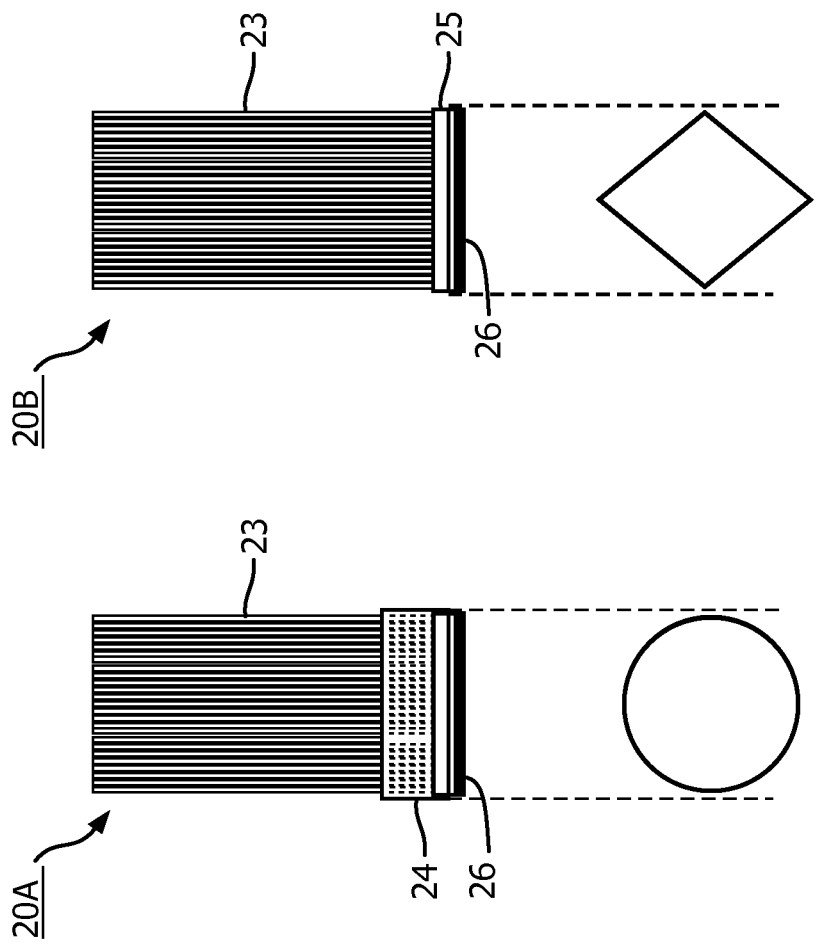
FIG. 3A  FIG. 3B  FIG. 4

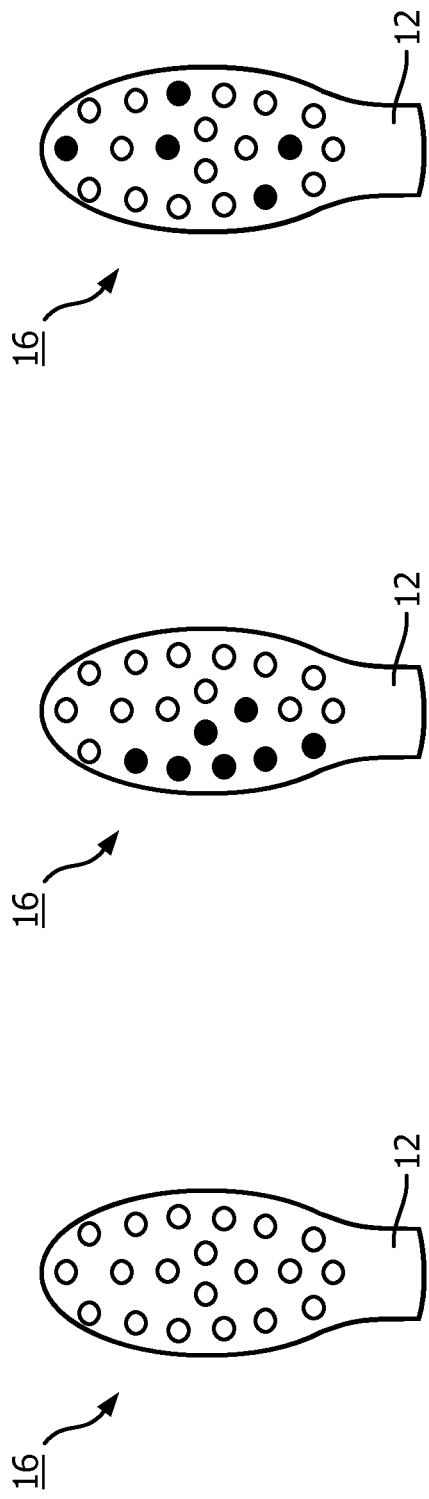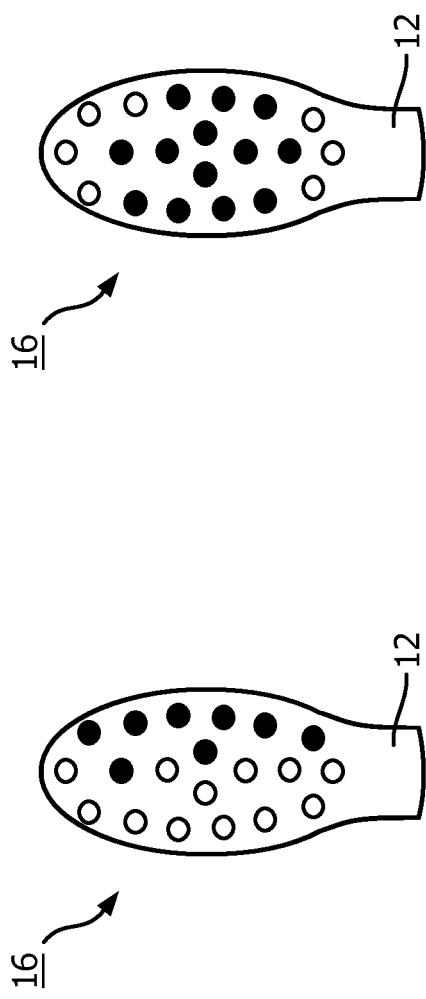
FIG. 10A FIG. 10B FIG. 10C FIG. 10D FIG. 10E

SYSTEMS FOR DETERMINING BRUSHING PARAMETERS IN AN ELECTRIC TOOTHBRUSH

This application is the U.S. National Phase application under 35 U.S.C. § 371 of International Application No. PCT/EP2019/062029, filed on 10 May 2019, which claims the benefit of U.S. Provisional Application No. 62/669,530, filed 10 May 2018. These applications are hereby incorporated by reference herein.

FIELD OF THE INVENTION

The present disclosure is directed generally to electric toothbrushes, and more specifically to systems and methods for determining brushing parameters when using an electric toothbrush.

BACKGROUND

Tooth brushing technique and compliance is a leading indicator of oral health. Dental professionals provide instruction but commonly rely on self-reporting for assessment of a patient's brushing technique. Similarly, individuals are motivated to brush well, but often do not receive feedback until bi-annual checkups. During each brushing session, a user must apply an appropriate amount of pressure at the correct angle and cover all dental surfaces for sufficient plaque removal without damaging the user's teeth or gums.

One challenge for current toothbrushes is to resolve the location of the end effector (bristles) in the mouth. For example, inertial motion units (accelerometer, gyroscope, magnetometer, etc.) are subject to drift due error in the double integration from acceleration to position. Also, the upper and lower jaws of a toothbrush user may be in close proximity and difficult to distinguish between. Further, pressure sensitive tooth brushes, while helpful in identifying whether a user is brushing too hard, rely on an overall applied force measured at the handle. As a result, pressure may not be accurately determined in some situations, such as for users who squeeze the brush head against their teeth with their cheek. In addition, determining the angle of the toothbrush with respect to the user's teeth is another challenge since the orientation of the user's teeth is unknown to the toothbrush as users commonly move their heads relative to the toothbrush while brushing. As a result, users may be required to follow a prescribed routine or to brush in front of a camera to most accurately track the location of the bristled end of the toothbrush in the user's mouth.

Accordingly, there is a continued need in the art for more accurately monitoring brushing parameters, such as the pressure applied to a user's teeth, and the location, angle, and/or orientation of the bristled end of the toothbrush with respect to the user's teeth.

SUMMARY OF THE INVENTION

The present disclosure is directed to inventive electric toothbrushes, and more specifically to systems and methods for determining brushing parameters such as the pressure, angle, and location of a brush head of an electric toothbrush during brushing. A tooth brush is comprised of many individual tufts of bristles. The geometries of each tooth may vary by location and from person to person. Individual tuft geometry (e.g., size, shape, length, material, stiffness, etc.) targets a specific function and/or location in a user's mouth. At any given location in the mouth, only a subset, e.g., 10-25%, of the total number of tufts are designed or expected to bear a disproportionate portion of the total pressure applied by the user. As a result, during use the distribution of pressure applied across the array of tufts varies. For a particular toothbrush user, the pattern of tufts where pressure is concentrated may be unique or specific for a given location in mouth, angle of the brush head, and applied load.

Embodiments for electric toothbrushes are disclosed in which the force at individual tufts can be monitored. The force distribution across the individual tufts can be used to develop different tuft signatures, which are indicative of brushing parameters such as the location, angle, and/or pressure of the bristled end of the toothbrush during brushing. In one embodiment, the tufts are each arranged as part of a sensor assembly to create normally open switches that require a prescribed axial force to close. The tuft signatures generated from the collected sensor data can be analyzed by algorithms and/or fused with data from other sensors to enhance the feedback that can be provided during brushing. For example, determination of the location of the brush head in the user's mouth, the brush head angle, and the applied pressure can all be improved.

Generally, in one aspect, a brush head for an electric toothbrush includes bristles extending from a base structure; an array of tufts, each tuft formed as a separate group of the bristles bundled together; and a sensor assembly configured to generate, for each of the tufts, a signal representative of a force applied to each of the tufts.

In one embodiment, each of the tufts is movable with respect to the base structure in response to the force, and the sensor assembly is configured to selectively form an electrical connection to generate the signal when the force exceeds a threshold.

In one embodiment, the base structure includes a rigid platen to which a conductive element is mounted and a flexible layer in which the tufts are embedded, and wherein resiliency of the flexible layer enables the tufts to move relative to the base structure. In one embodiment, each of the tufts is provided with a conductive surface that is moved into contact the conductive element when the force exceeds the threshold.

In one embodiment, the brush head further includes a conductive layer for one or more of the tufts that is pushed by a corresponding one of the tufts into contact with the conductive element when the force exceeds the threshold. In one embodiment, the conductive element is a discontinuous element and the electrical connection electrically connects the discontinuous element. In one embodiment, the discontinuous element includes two planar halves or two raised pads.

Generally, in another aspect, an electric toothbrush includes a brush head according to claim 1 and a controller configured to generate a tuft signature representing a distribution of the force applied across the array of tufts.

In one embodiment, the controller is configured to classify an angle of the brush head relative to a user's teeth depending on the tuft signature. In one embodiment, the controller is configured to classify a pressure exerted by the brush head onto a user's teeth depending on the tuft signature.

In one embodiment, the tuft signature includes a plurality of training tuft signatures and a current tuft signature, wherein the controller is configured to create, during a training process, a signature map associating each of the training tuft signatures to particular locations in a user's mouth, and wherein the controller is configured to determine, during use, a location of the brush head in the user's mouth by comparing the current tuft signature to the signature map.

In one embodiment, the controller is configured to receive positional data from a position sensor and to fuse the positional data with the tuft signature to recalibrate or verify a determined position of the brush head in a user's mouth.

Generally, in one aspect, a method of operating an electric toothbrush, includes receiving a force on each of a plurality of tufts of a brush head of the electric toothbrush; generating, for each of the tufts, a signal representative of the force individually applied to each of the tufts; and generating a tuft signature representing a distribution of the force applied to the tufts.

In one embodiment, the tufts are arranged as normally open switches that are movable with respect to a base structure of the brush head in response to the force, and the generating includes forming an electrical connection with a given one of the tufts to generate the signal when the force exceeds a threshold for that give one of the tufts.

In one embodiment, the method further includes determining, from the tuft signature, at least one of a position of the brush head in a mouth of a user, an angle of the brush head relative to teeth of the user, and a brushing force exerted by the user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 3A and 3B illustrate example tufts of bristles for a brush head of a toothbrush according to embodiments disclosed herein.

FIG. 4 is a cross-sectional view of a tuft in a base of a brush head to form a sensor assembly according to one embodiment disclosed herein.

FIGS. 10A-10E illustrate various example tuft signatures that may represent or are associated with different angles and/or pressures of a bristled end of a brush head during brushing.

DETAILED DESCRIPTION OF EMBODIMENTS

The present disclosure describes various embodiments of electric toothbrushes. Applicant has recognized and appreciated that it would be beneficial to provide an electric toothbrush configured with a sensor assembly to monitor the force applied to each individual tuft of bristles of the brush head of the toothbrush. A particular goal of utilization of certain embodiments of the present disclosure is to more accurately determine brushing parameters such as the pressure, angle, and location of a brush head of an electric toothbrush during brushing.

In view of the foregoing, various embodiments and implementations are directed to electric toothbrushes, and more specifically to systems and methods for determining brushing parameters such as the pressure, angle, and location of a brush head of an electric toothbrush during brushing. A tooth brush is comprised of many individual tufts of bristles. The geometries of each tooth may vary by location and from person to person. Individual tuft geometry (e.g., size, shape, length, material, stiffness, etc.) targets a specific function and/or location in a user's mouth. At any given location in the mouth, only a subset, e.g., 10-25%, of the total number of tufts are designed or expected to bear a disproportionate portion of the total pressure applied by the user. As a result, during use the distribution of pressure applied across the array of tufts varies. For a particular toothbrush user, the pattern of tufts where pressure is concentrated may be unique or specific for a given location in mouth, angle of the brush head, and applied load.

Embodiments for electric toothbrushes are disclosed in which the force at individual tufts can be monitored. The force distribution across the individual tufts can be used to develop different tuft signatures, which are indicative of the location, angle, and/or pressure of the bristled end of the toothbrush during brushing. In one embodiment, the tufts are each arranged as part of a sensor assembly to create normally open switches that require a prescribed axial force to close. The tuft signatures generated from the collected sensor data can be analyzed by algorithms and/or fused with data from other sensors to enhance the feedback that can be provided during brushing. For example, determination of the location of the brush head in the user's mouth, the brush head angle, and the applied pressure can all be improved.

Figure 1:
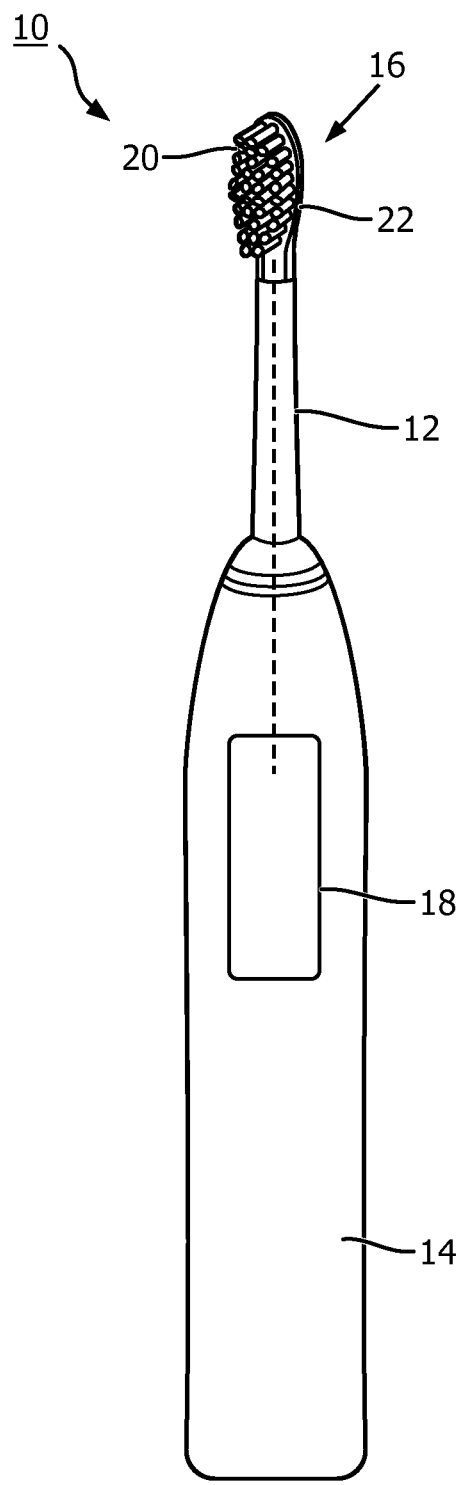
FIG. 1 schematically illustrates an electric toothbrush according to one embodiment disclosed herein.

Referring to FIG. 1, an electric toothbrush 10 according to one embodiment is illustrated having a brush head 12 and a handle assembly 14. The brush head 12 includes a bristled end 16 distal from the handle assembly 14, e.g., for engaging against and brushing a user's teeth while the toothbrush 10 is in use. For example, the handle assembly 14 may include a drive assembly (e.g., motor) configured to cause vibrations, oscillations, or other movement of the brush head 12 to assist in brushing the user's teeth with the bristled end 16. The brush head 12 may be a separate component that is removably attachable to the handle assembly 14 to enable users to change brush head 12, e.g., to enable a different functionality for the toothbrush 10, or periodically (e.g., every three months) to replace the brush head once the bristled end 16 becomes overly used or spent.

The toothbrush 10 may include a controller 18 configured to control operation of the toothbrush 10. For example, the controller 18 may include corresponding hardware (e.g., processor, memory, communication module, position sensor, etc.) and software (e.g., application, firmware, etc.) configured to enable one or more different modes of operation for the toothbrush 10. The entire controller 18 or a portion thereof may be included or embedded in the handle assembly 14 and/or the brush head 12. The controller 18 may also enable data communication with one or more external or remote devices, such as a smartphone or cloud-based server. For example, a software application on the smartphone may be associated with the toothbrush 10 and configured to receive and display data gathered by sensors of the toothbrush 10, to enable a user to interface with the toothbrush 10 via a graphical user interface, etc. It is to be appreciated that the controller 18 may be at least partially formed by, or otherwise utilize, this type of external computing resources to assist in providing its functionality as described herein. The use of the controller 18 in storing and analyzing data collected from one or more sensors embedded in the brush head 12 is discussed in more detail below.

Figure 2:
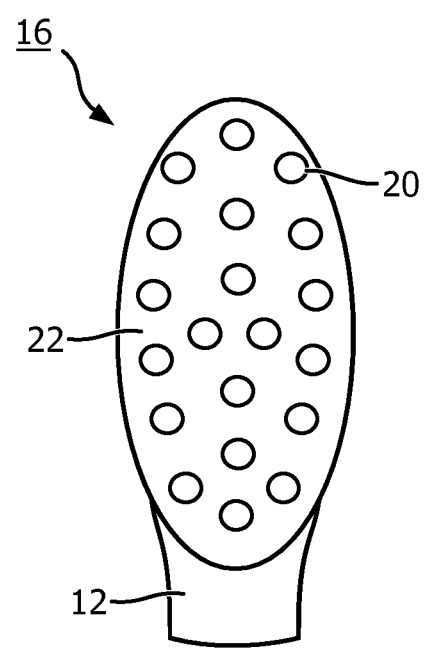
FIG. 2 illustrates a brush head having a plurality of tufts of bristles according to one embodiment disclosed herein.

The bristled end 16 of the toothbrush 10 comprises many individual filaments or bristles that are bundled into a plurality of tufts 20 extending from a base 22 of the brush head 12. For example, the brush head 12 includes twenty of the tufts 20 in the embodiment of FIG. 2 (each of the tufts 20 schematically illustrated as a dot). It is to be appreciated that any number of tufts 20 may be included and any number of individual bristles may be included in each tuft 20. Each of the tufts 20 may be of uniform size and shape (e.g., each having the same number of bristles arranged in the same shape or pattern), or various ones of the tufts 20 may include a greater or fewer number of bristles bundled in the same or different shapes, and/or the bristles may be of different lengths, materials, thicknesses, or construction.

In one embodiment, the tufts 20 are formed by securing one end of the bristles together, such as by fusing, clamping, crimping, adhering, or fastening. For example, as shown in FIG. 3A, a tuft 20A is formed by a ring 24 secured about a group of bristles 23 that maintain the tuft 20A as a discrete or individual unit. In FIG. 3B, a tuft 20B includes a slug of material 25 created by fusing a group of the bristles 23 together (e.g. melting, welding, etc.). It is to be appreciated that the tufts 20A and 20B are specific examples for the tuft 20 and that any description with respect to the tuft 20 applies generally to both the tufts 20A and 20B. As discussed in more detail below, a surface of the tufts 20 opposite to the free-end of the bristles (e.g., a backside or bottom surface) is provided as a conductive surface 26. The ring 24, slug of material 25, etc., can assist in maintaining the tufts 20, including the conductive surface 26, in the desired shape, e.g., a circular shape in FIG. 3A, a diamond shape in FIG. 3B, etc., although any other shape may be utilized. As with conventional toothbrushes, the bristles opposite to the ring 24 and/or slug of material 25 may be free or unbound to facilitate brushing.

FIG. 4 shows a cross-section of one of the tufts 20 embedded or potted into the base 22 of the brush head 12 to form a sensor assembly 28. In this embodiment, the base 22 includes a flexible layer 30 (e.g., a resilient or elastically deformable plastic), which is fixed to a rigid platen 32 (e.g., a hard plastic). The sensor assembly 28 includes a conductive element 34 on the platen 32 opposing the conductive surface 26 of each of the tufts 20. Elasticity of the material forming the flexible layer 30 can be used to maintain an air gap 36 between the conductive surface 26 and the conductive element 34.

The conductive surface 26 and the conductive element 34 may be formed by coating or covering the tuft 20 and platen 32 in metal, or by otherwise metalizing or providing a metal element for the respective components. For example, metallization of the platen 32 may be achieved by patterning an existing polymer platen via a contact mask (i.e., a physical structure on surface to guide metal deposition) or a photomask (i.e., light sensitive polymer that is patterned via exposure to ultraviolet light). The tufts 20 may be metalized in a variety of different ways as well. For example, individual tufts may be metalized prior to positioning relative to the platen 32 and the flexible layer 30 injection modeled to retain the tufts 20 in place. In one embodiment, the tufts are first potted in a flexible polymer forming the layer 30, then metal is deposited across the bottom surface of the tufts 20. This assembly would then be aligned and adhered to the platen 32. Individual contacts may be maintained by a step change between the bottom of the layer 30 or the top of the platen 32 and start of the tuft 20 (which defines the air gap 36). In one embodiment the flexible layer 30 is preformed to have a metal layer or addition of a metal foil. When inserting the tufts 20, the metal layer tears around the circumference of the tuft 20 to achieve a segmented pad.

The air gap 36 may also be set in a number of different ways. For example, the air gap 36 may be pre-defined before adhering a flexible component forming the flexible layer 30 to the platen 32. In one embodiment, the air gap 36 is formed by an additional layer of material between the flexible layer 30 and the platen 32 that is dissolved away or otherwise removed. In one embodiment, the air gap 36 is set by the addition of air into a part mold at the corresponding location. In one embodiment, the air gap 36 is maintained by a hydrophobic surface tension behavior of a selected polymer material (e.g., for the flexible layer 30) with respect to a selected metal material (e.g., for the conductive element 34), which forms a bubble or pocket around each conductive component.

Figure 5:
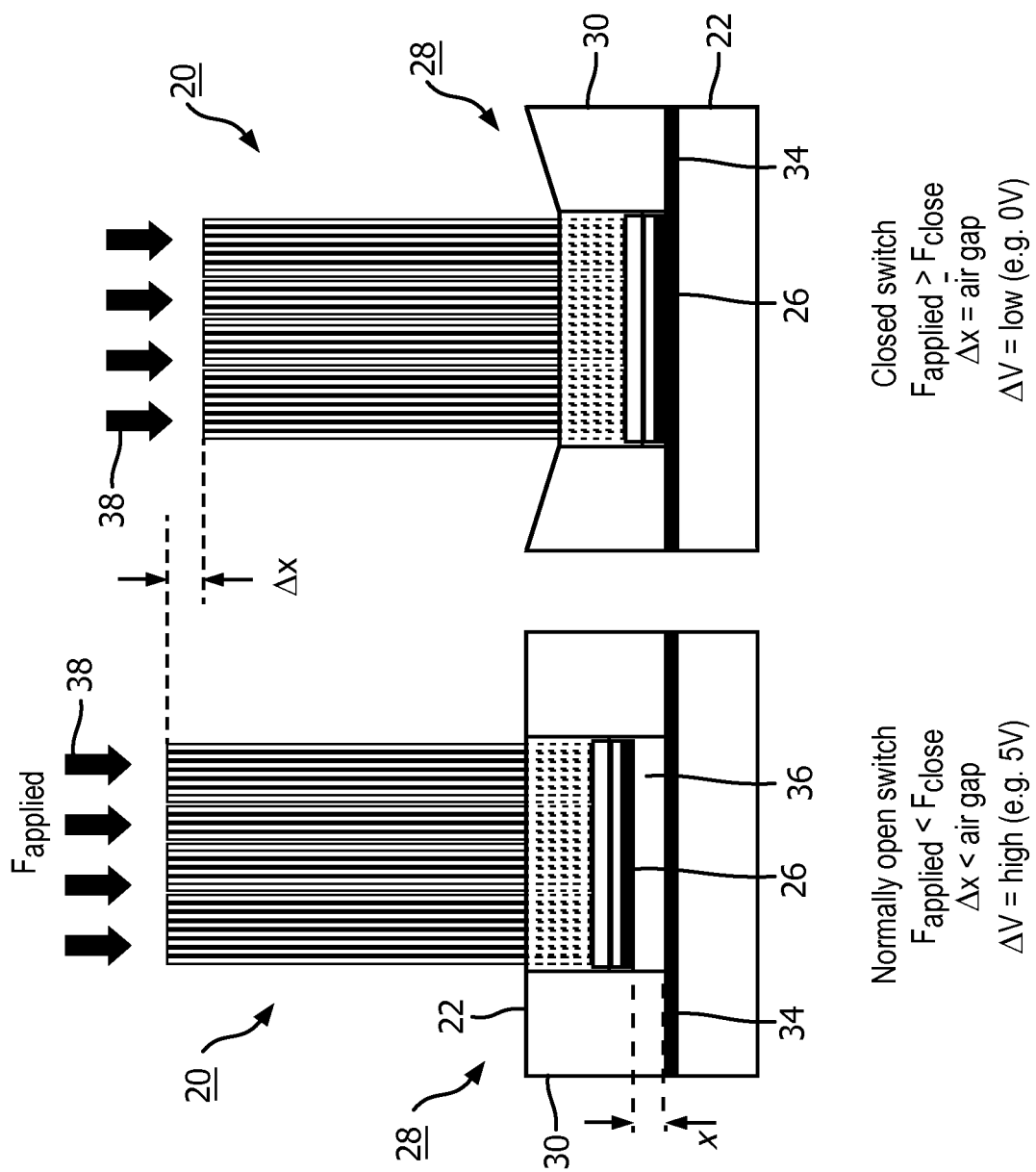
FIG. 5 is a cross-sectional view of a tuft in a base of a brush head illustrating how the tuft can be arranged to form a normally open switch that is transitionable to a closed state according to one embodiment disclosed herein.

As shown in FIG. 5, the flexible layer 30 may also enable each tuft 20 to be displaced in response to an applied force 38 (e.g., a force applied to the tufts 20 by a user engaging the bristled end 16 of the brush head 12 against the user's teeth). If the applied force 38 is sufficiently high (i.e., overcoming the natural resiliency of the flexible layer 30) the conductive surface 26 can be brought into contact with the conductive element 34, thereby establishing an electrical connection. For example, as illustrated, the air gap 36 may have a width 'x', such that application of the applied force 38 can resiliently deform the flexible layer 30 to shift the tuft 20 in an amount Δx, thereby contacting the conductive surface 26 and the conductive element 34 together.

As noted above, resiliency of the flexible layer 30 can be used to bias the tufts 20 away from the conductive element 34. As a result, each tuft 20, with its conductive surface 26 and the respective conductive element 34 in the base 22, is configured to act as a normally open switch (for ease of discussion herein, the term "tuft switch" may be utilized). In this way, the sensor assembly 28 may be formed as an array of tuft switches each arranged in this manner. The electrical connection between the conductive surfaces 26 and the conductive elements 34 can be identified, e.g., by the controller 18, as a change in an electrical parameter resulting from the electric connection, such as potential (ΔV), current, resistance, capacitance, impedance, etc. For example, each tuft 20, arranged as a switch, can be assigned or associated with a unique address known by the controller 18. As discussed in more detail below, the known locations or addresses can be used, e.g., by the controller 18, to map the distribution of forces applied to the bristled end 16 during a brushing event in the user's mouth.

In one embodiment, the value that the applied force 38 needs to be to displace each of the tufts 20 the distance x can be set selecting the material properties and dimensions of the flexible layer 30. In other words, the material properties and dimensions of the tufts 20 can be selected to set a threshold force, $F_{close}$, such that each tuft switch is only transitioned to the closed configuration when the applied force 38 exceeds the threshold force $F_{close}$ for that tuft 20. For example, such a threshold force may be set as a force that is approximately equal to or derived from a recommended brushing force or pressure (e.g., that will sufficiently clean a user's teeth without damaging the user's tooth enamel and/or gums). In this way, the sensor assembly 28 is configured to produce a signal for each of the tufts 20, depending on the presence or absence of electrical signals that indicate which of the tufts 20 are subjected to the applied force 38 over the threshold force $F_{close}$.

Figure 6:
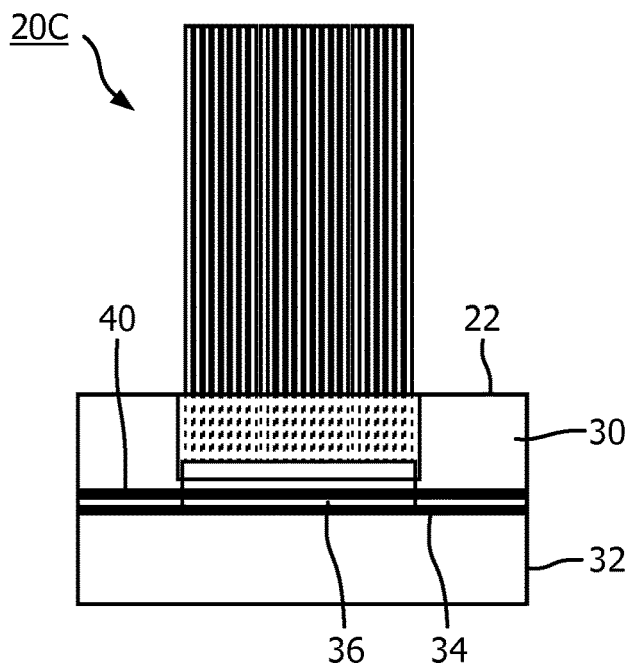
FIG. 6 is a cross-sectional view of a tuft installed in a base of a brush head of a toothbrush according to another embodiment disclosed herein.

It is to be appreciated that the force exerted on each tuft 20 can be determined in a variety of ways, for example, an alternate embodiment of a tuft 20C is shown in FIG. 6 in which the bottom surface of the tuft 20C is not conductive (i.e., the tuft 20C does not include the conductive surface 26). Instead, a metalized or conductive layer 40 is provided on, in, or through the flexible layer 30, and the air gap 36 is created between the conductive layer 40 and the conductive element 34. As another example, any or all of the conductive components may be removed and replaced by a force sensor configured to determine the applied force. For example, one or more piezoelectric elements that generate a voltage in response to the applied force may be included. In another embodiment, magnetic components may be included in the tufts 20 and/or the base 22 and Hall Effect sensors used to detect when the tufts 20 are displaced due to sufficiently high forces. In one embodiment, a separate biasing element, e.g., a spring, may be included instead of or in addition to the flexible layer 30, which enables the threshold closing force ($F_{close}$) to be more particularly set. Those of ordinary skill in the art will appreciate other sensor assemblies that can be used to measure or otherwise determine force.

Figure 7:
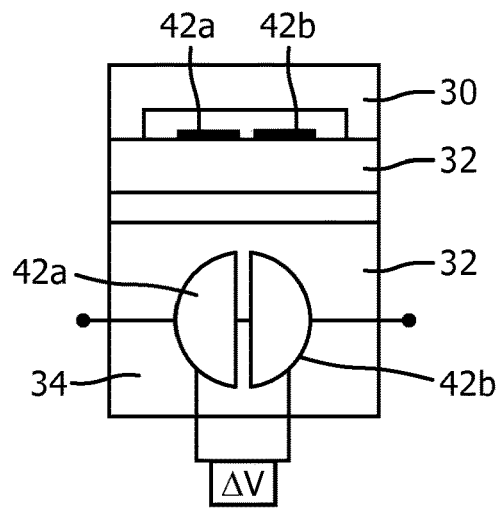
FIG. 7 is a cross-sectional side view and top view showing components of a sensor assembly according to one embodiment herein.
Figure 8:
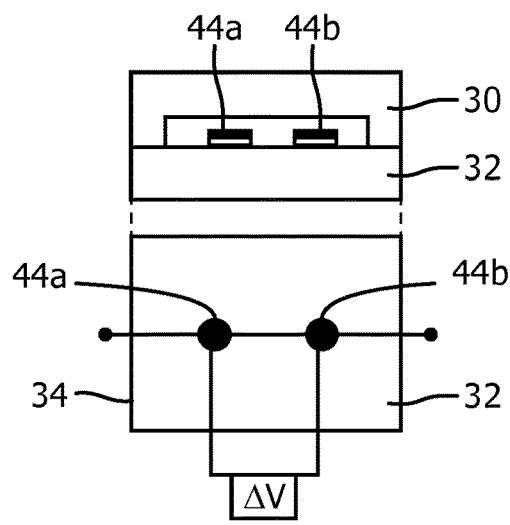
FIG. 8 is a cross-sectional side view and top view showing components of a sensor assembly according to one embodiment herein.

In one embodiment, the conductive element 34 is a discontinuous element, e.g., includes two halves 42a and 42b as shown in FIG. 7. In this way, when the conductive surface 26 contacts the conductive element 34, the conductive surface 26 completes an electrical connection between the halves, 42a and 42b for creating the aforementioned electrical signal. As shown in FIG. 8, the conductive element 34 may include separate raised pads 44a and 44b instead of the planar construction of FIG. 7. Those of ordinary skill in the art will recognize that these are merely two examples and that other constructions for the conductive element 34 are possible. For example, the conductive element 34 may be a continuous element, with one half of an electrical circuit connected to each of the conductive element 34 and the conductive surface 26, such that the circuit is completed when the electric contact is made between the conductive element 34 and the conductive surface 26.

Regardless of construction of the sensor assembly 28, the controller 18 can be configured to monitor the state of each tuft 20. For example, with respect to the embodiments in which each of the tufts 20 at least partially form a normally-opened switches, the controller 18 may be configured to monitor which of the tufts are opened versus which of the tufts 20 are in the closed state. That is, the controller 18 may register a '1' if the applied pressure has closed the switch and a '0' otherwise. In embodiments that utilize a piezoelectric material or other force sensor, then the controller 18 may be arranged to detect the force applied at each of the tufts.

Figure 9:
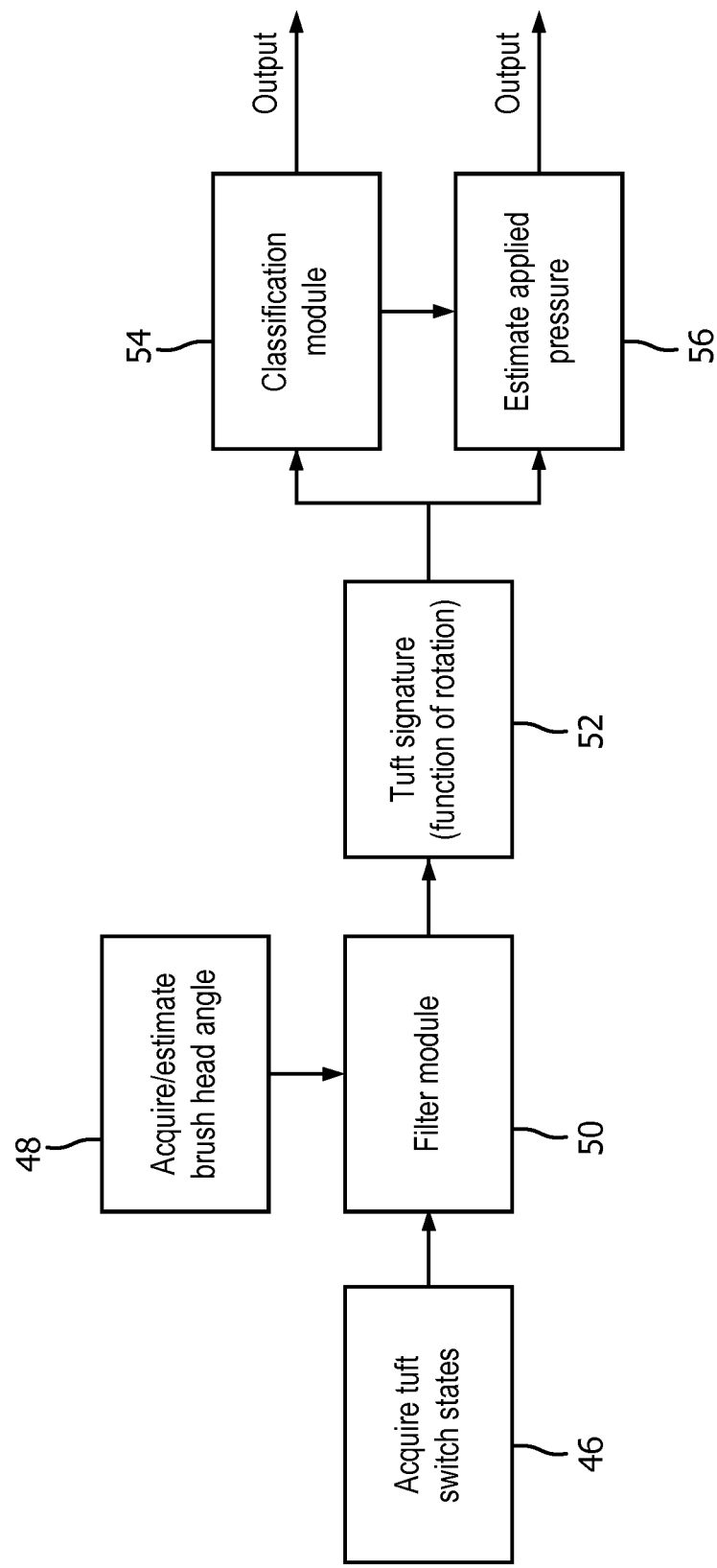
FIG. 9 is a block diagram describing a method and system for operating an electric toothbrush to determine a pressure and/or angle of a brush head according to one embodiment disclosed herein.

FIG. 9 illustrates a block diagram showing a method from which the status of the tuft switches can be analyzed, e.g., by the controller 18 to determine or verify the angle, pressure, and estimated location of the bristled end 16 in the user's mouth. In step 46, the controller 18 acquires the status of each tuft 20 from the sensor assembly 28 as described above (e.g., '0' for open switches and '1' for closed switches). In this step, the time domain data from all tufts may be acquired from the brush head. As mentioned above, the sensor modality may be a number of different electrical parameters (e.g., voltage, current, resistance, impedance, capacitance). In this step, the frequency of sampling (e.g., how often the tuft switch status is checked) and duration of the sample packet can be set (i.e. analyze one sampling cycle at a time or 'n'-cycles together).

The angle of the bristled end 16 with respect to the user's teeth may be acquired or estimated at step 48 if desired. For example, the angle of the bristles with respect to the user's teeth may affect force distribution on the tufts 20, and therefore this input may be useful to identify and/or distinguish between different rotation states. A measurement could be direct (e.g., an encoder) or indirect (e.g., motor parameters such as current draw).

The data acquired or generated in steps 46 and/or 48 may be fed into a filter module 50. For example, the raw acquired data is likely to be noisy and thus the signal from each of the tuft switches could be filtered. In one embodiment, only signals corresponding to forces applied above a certain minimum contact duration threshold are considered. For example, any contact sensed for less than about 1-10 ms, or some other duration of contact, may be discarded. The filter module 50 may be configured with a series of filters to segment out certain portions of data corresponding with different ranges for the angle of the brush head 12 based on the data gathered in step 48.

At step 52, a tuft signature for each tuft may be generated. By tuft "signature" it is meant the corresponding data from the sensor assembly 28 addressed to indicate the state of each tuft 20 at any given moment or sampling cycle. For example, the particular identification of which tuft switches are "open" and "closed" at any given moment can be analyzed as a tuft signature. It is noted that the tuft signature is different depending on the angle of rotation and the applied pressure, and can be estimated or determined from the filtered data. For example, FIGS. 10A-10E show a variety of different tuft signatures, based on the pattern of open (white dots) and closed (black dots) switches. That is, FIG. 10A shows no load (all switches are open), FIG. 10B shows load on "left" side only (with respect to the orientation of FIG. 10B), FIG. 10C shows a nominal load (e.g., some of the tuft switches are closed), FIG. 10D shows load on "right" side (with respect to the orientation of FIG. 10D), and FIG. 10E shows excessive load (e.g., most of the switches are closed, indicating a high pressure).

In one embodiment, the determination of rotation is grouped into at least three states which define neutral position (the bristles are extending substantially perpendicular to the surface of the user's teeth), rotated "up" and rotated "down" with respect to the surface of the user's teeth. Additional states may be included if resolution is sufficient and/or desired for each situation. The state of each tuft switch can be estimated as a function of one of the aforementioned rotation groups.

Once the signatures for the tufts are generated, the signatures can be passed to a classification module 54, as shown in FIG. 9. The tuft signature from a given rotation group, or combination of groups, are analyzed and classified. Based on the contact patterns the currently applied load can be classified, e.g., the angle or rotation of the brush head can be determined as rotated up, rotated down, or centered. If the load is concentrated on one particular side for a whole cycle it can be determined that the brush is rotated in that direction. For example, depending on which side of the user's mouth the brush head 12 is positioned, the signatures of FIGS. 10B and 10D could be determined as either rotated "up" or rotated "down", since load on only one side indicates that that side is rotated toward the user's teeth. This determination could be used to supplement the angle data generated in step 48. The classifications performed by the classification module 54 can be determined using any technology, technique, method, or manner known or developed in the art, such as, but not limited to, heuristic models, decision trees, naïve Bayes classifiers, support vector machine, machine learning, and/or artificial intelligence (neural networks, ensembles, etc.).

As additional examples, the exerted pressure can be determined based on the tuft signature at step 56 (e.g., using the classification module 54 or other algorithm). For example, low, nominal, and excessive pressures can be determined respectively from FIG. 10A (all switches are open), FIG. 10C (only a small number of switches are closed), and FIG. 10E (most of the switches are closed). If the number of closed tufts exceeds a particular threshold (e.g., between about 25-40% of the tuft switches are closed), the controller 18 may determine that that applied force 38 is sufficient, while fewer than this may indicate that the user isn't brushing hard enough, and more than this may indicate that the user is brushing too hard. Further, if a given tuft or tufts remains closed for an entire rotation range, brushing event, predetermined length of time etc., this may also indicate excessive pressure as the bristles may be pinned instead of sweeping (i.e., the user is "scrubbing" instead of brushing).

In addition to more generally classifying the exerted pressure (e.g., as "low", "nominal", and "excessive" as described above, the tuft signatures may also be used to more quantifiably estimate the applied pressure. That is, since the pressure to close a given tuft switch can be controlled by the design and manufacturing processes, as described above, the applied pressure can be estimated. In a nominal loading state, for a given tuft signature, the applied pressure can simply be estimated from a summation of the number tufts in the closed state with knowledge of the required closing force for each tuft (e.g., the threshold force $F_{close}$) and surface area of the tufts. If the applied pressure cannot be estimated, e.g., due to unacceptably large (e.g., all) or small (e.g., none) percentage of the tufts are indicating a closed status, an "excess pressure" or "insufficient pressure" could be passed as output instead of a quantified value.

In one embodiment, the relative location of the bristled end 16 is also provided, e.g., by the controller 18, as a fusion of data using the tuft signatures and the output of a position sensor, such as an IMU, optical proximity sensor, etc., embedded in and/or included by the electric toothbrush 10. For example, the tuft signatures may be used as a reference measurement to correct compounding errors from an IMU embedded in the electric toothbrush 10. This may be accomplished either by building up a signature map of the user's teeth over time (e.g., as the user brushes normally), or initially scanning a user's teeth with the brush head. In the latter, the user may be guided (e.g., instructed via printed instructions, an application installed on a smartphone, etc.), to press and roll the brush head 12 against particular teeth without the motor running and/or to follow a particular path or routine during one or more brushing sessions. This would form a map of the tuft signatures as a function of angle and position in mouth.

Figure 11:
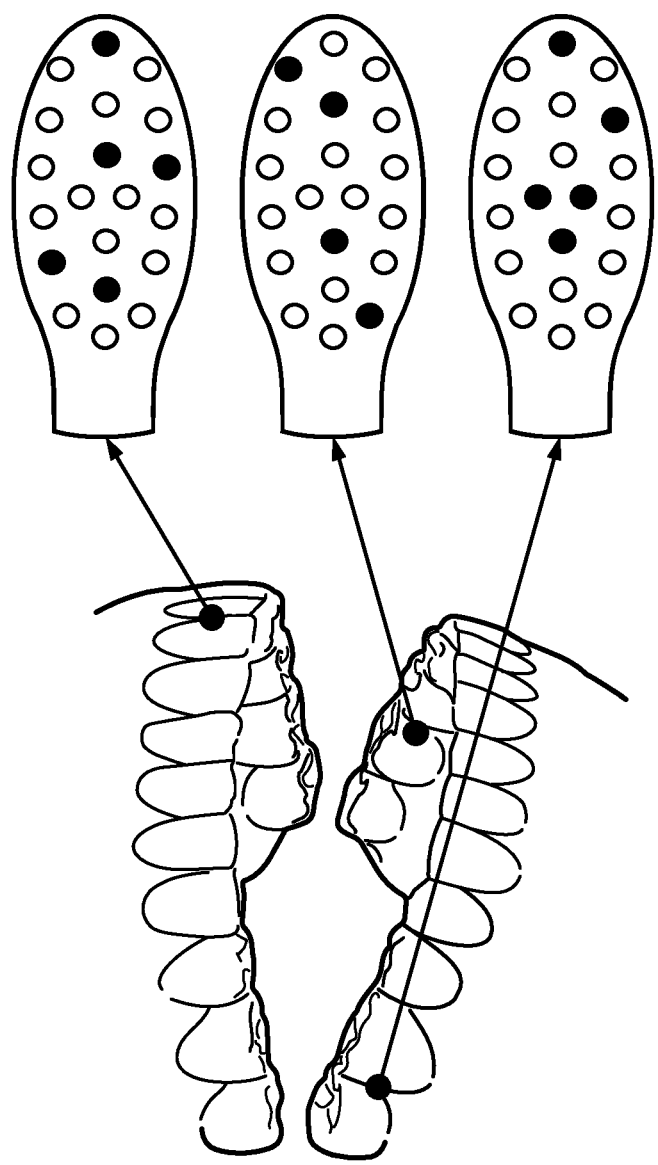
FIG. 11 illustrates various example tuft signatures that may represent or are associated with different locations of a bristled end of a brush head in a user's mouth during brushing.

For example, FIG. 11 schematically illustrates a signature map showing that different locations in the user's mouth may yield different patterns of contact (signatures) due to teeth geometry. The controller 18 can be trained to build a tuft signature map as noted above. In this way, the controller 18 will be able to estimate the location of the brush head 12 by correlating the current tuft signature sensed by the sensor assembly 28 at any given moment with different locations in the user's mouth under typical brushing conditions.

Figure 12:
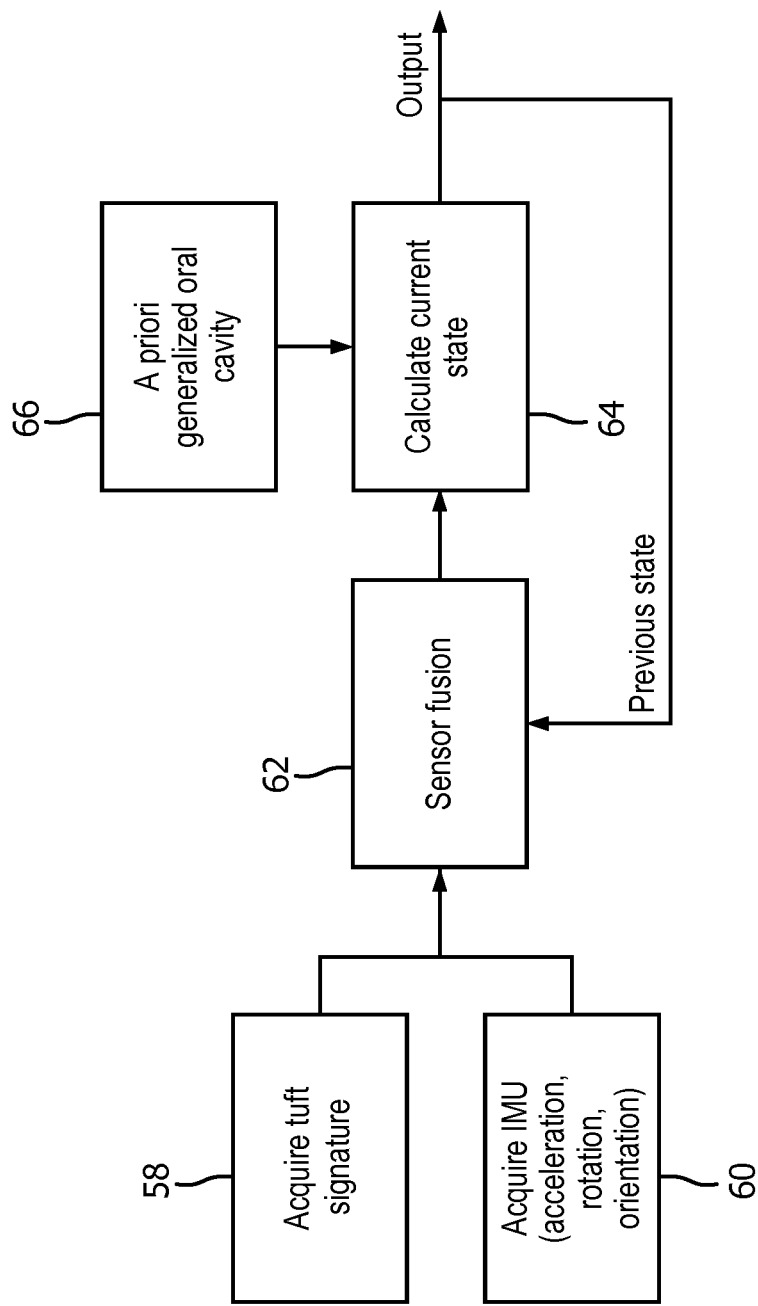
FIG. 12 is a block diagram describing a method and system for operating an electric toothbrush to determine a location of a brush head according to one embodiment disclosed herein.

A method of determining location can be appreciated in view of the block diagram of FIG. 12. Step 58 includes determining the tuft signatures from the sensor assembly 28 as described above, e.g., as shown in FIG. 11. The current tuft signature can be compared to the signature map for that person to estimate the location, or possible locations, in the user's mouth. Step 60 includes acquiring positional data, such as from an IMU or other position sensor in communication with the controller 18. It is noted that similar signatures may be developed in the signature map for a number of different locations, but confidence as to the particular location at any given time can be increased by additionally considering the IMU data from step 60. To this end, step 62 includes fusing the data from steps 58 and 60 together, which leads to a calculation at step 64 of the current location of the bristled end 16 of the brush head 12. For example, the drift in an IMU may be compensated for by periodically recalibrating the sensor to the estimated position provided in the step 58, or the position determined in step 58 can be verified using the IMU data from step 60.

As an additional input for step 64, generalized information (e.g., collected in a clinical or lab setting, by aggregating the measurements of other users, etc.) can be provided at step 66 to assist in analyzing the fused IMU and tuft signature data. The determined location for each current cycle can be used to inform the determination for the next cycle. The output of the controller 18 may include a graphical representation (e.g., via a screen or display of a smartphone in communication with the controller 18) of a user's mouth indicating areas in which the user brushed too hard, was angled improperly, missed or spent too little time, etc.

Advantageously, recalibration in this manner enables a user to accurately gather brushing information without requiring the user to follow a preset or instructed brushing routine or path. For example, the controller 18 can accurately identify the location of the bristled end 16 even if the user transitions quickly, abruptly, or rapidly between different locations in the user's mouth, starts the brushing session at any desired location, moves their head or body around while brushing, etc.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A brush head for an electric toothbrush, comprising:
bristles extending from a base structure; and
an array of tufts, each tuft formed as a separate group of the bristles bundled together;
a sensor assembly configured to generate, for each of the tufts, a signal representative of a force applied to each of the tufts; and
a controller configured to generate a tuft signature representing a distribution of the force applied across the array of tufts, wherein the controller is further configured to receive positional data from a position sensor and to fuse the positional data with the tuft signature to recalibrate or verify a determined position of the brush head in a user's mouth.

2. The brush head of claim 1, wherein each of the tufts is movable with respect to the base structure in response to the force, and the sensor assembly is configured to selectively form an electrical connection to generate the signal when the force exceeds a threshold.

3. The brush head of claim 2, wherein the base structure includes a rigid platen to which a conductive element is mounted and a flexible layer in which the tufts are embedded, and wherein resiliency of the flexible layer enables the tufts to move relative to the base structure.

4. The brush head of claim 3, wherein each of the tufts is provided with a conductive surface that is moved into contact the conductive element when the force exceeds the threshold.

5. The brush head of claim 3, further comprising a conductive layer for one or more of the tufts that is pushed by a corresponding one of the tufts into contact with the conductive element when the force exceeds the threshold.

6. The brush head of claim 3, wherein the conductive element is a discontinuous element and the electrical connection electrically connects the discontinuous element.

7. The brush head of claim 6, wherein the discontinuous element includes two planar halves or two raised pads.

8. The electric toothbrush of claim 1 wherein the controller is configured to classify an angle of the brush head relative to a user's teeth depending on the tuft signature.

9. The electrical toothbrush of claim 1, wherein the controller is configured to classify a pressure exerted by the brush head onto a user's teeth depending on the tuft signature.

10. A brush head for an electric toothbrush, comprising:
bristles extending from a base structure; and
an array of tufts, each tuft formed as a separate group of the bristles bundled together;
a sensor assembly configured to generate, for each of the tufts, a signal representative of a force applied to each of the tufts; and
a controller configured to generate a tuft signature representing a distribution of the force applied across the array of tufts, wherein the tuft signature includes a plurality of training tuft signatures and a current tuft signature, wherein the controller is configured to create, during a training process, a signature map associating each of the training tuft signatures to particular locations in a user's mouth, and wherein the controller is configured to determine, during use, a location of the brush head in the user's mouth by comparing the current tuft signature to the signature map.

* * * * *